(12) United States Patent
Montgomery et al.

(10) Patent No.: US 10,030,406 B2
(45) Date of Patent: Jul. 24, 2018

(54) INTERACTIVE DEVICE FOR MEMORIAL INFORMATION

(71) Applicants: David Montgomery, Ladera Ranch, CA (US); Joshua Lintz, Evanston, IL (US)

(72) Inventors: David Montgomery, Ladera Ranch, CA (US); Joshua Lintz, Evanston, IL (US)

(73) Assignee: NorthStar Memorial Group, Houston, TX (US)

( * ) Notice: Subject to any disclaimer, the term of this patent is extended or adjusted under 35 U.S.C. 154(b) by 42 days.

(21) Appl. No.: 15/197,092

(22) Filed: Jun. 29, 2016

(65) Prior Publication Data

US 2016/0378245 A1 Dec. 29, 2016

Related U.S. Application Data

(60) Provisional application No. 62/186,176, filed on Jun. 29, 2015.

(51) Int. Cl.
| | |
|---|---|
| *E04H 13/00* | (2006.01) |
| *G06F 3/14* | (2006.01) |
| *G06F 3/147* | (2006.01) |
| *A61G 17/08* | (2006.01) |

(52) U.S. Cl.
CPC .......... *E04H 13/008* (2013.01); *A61G 17/08* (2013.01); *G06F 3/147* (2013.01); *G06F 3/1423* (2013.01); *A61G 2203/16* (2013.01); *A61G 2203/20* (2013.01); *G06F 2203/04104* (2013.01)

(58) Field of Classification Search
None
See application file for complete search history.

(56) References Cited

U.S. PATENT DOCUMENTS

2010/0307037 A1* 12/2010 Chi ...................... E04H 13/003
40/124.5

* cited by examiner

*Primary Examiner* — Gustavo Polo
(74) *Attorney, Agent, or Firm* — Rutan & Tucker LLP; Hani Z. Sayed

(57) ABSTRACT

An apparatus and method are provided for an interactive memorial device to provide a dynamic, interactive, multi-touch display to visitors of a final resting place or memorial of a deceased individual. The interactive memorial device enables the visitors to interact with a combination of dynamic and customizable information relating to the decedent or memorial. An operating system enables an end-user, such as any of the visitors, to interact with the operating system by way of navigation controls. A display screen preferably comprises a transparent multi-touch display configured to enable the visitors to view and interact with information and provides dynamic memorialization content to the visitors while maintaining view of real memorialization objects and personalized mementos in the background. Loudspeakers are configured to play audio soundtracks accompanying memorial-related information. In some embodiments, the interactive memorial device includes a camera suitable for social networking functions, such as online video conferencing and chat.

18 Claims, 4 Drawing Sheets

INTERACTIVE DEVICE FOR MEMORIAL INFORMATION

CROSS REFERENCE

This application claims the benefit of U.S. Provisional Patent Application No. 62/186,176, filed Jun. 29, 2015, entitled "Interactive Device For Memorial Information," which application is incorporated herein by reference in its entirety.

FIELD OF INVENTION

The field of the present disclosure generally relates to memorialization of an individual, individuals, or an entity. More particularly, the field of the present disclosure relates to an apparatus and a method for an interactive memorial device for providing a dynamic, interactive, multi-touch display to visitors of a final resting place of a deceased individual or their memorial.

BACKGROUND

Cemeteries and different burial places have been contemplated from the beginning of time. The human race has always desired the best ways to respect and bury their dead. Final disposition preferences have changed over the centuries from primarily full body casketed burial to the increasing popularity of cremation. The type of burials too have changed, with options ranging from full body casketed burial, full body entombment, cremated remains inurement, burial or scattering, to more elaborate forms of burying, enclosing or memorializing the deceased, and the like.

Today, the most common types of final disposition are cremation and full body casketed burial or entombment. In more recent times, cremation has become increasingly popular. The cremated human remains are typically placed inside a cinerary urn for permanent storage and presentation. Typically, urns are inurned at cemeteries inside a columbarium, mausoleum, in-ground burial plot, or housed within various types of memorialization product and property. Alternatively, families can choose to scatter the cremated remains or store them at their home or the like. Alternatively, full body disposition involves the burial or entombment of a full body; and includes the use of a casket, a burial plot, and grave-marking tombstone or memorial. The human remains are prepared for burial, entombment or inurnment, placed in a casket or cinerary urn, and either lowered into the ground, entombed in a mausoleum, inured in a columbarium or the like. A gravestone or memorial is placed on top of or affixed to the burial or memorial site to mark where the deceased is located or memorialized. Cemeteries and memorial parks typically are parks with trees, grass, and other park-like structures. Some cemeteries are located on church grounds or other holy sites. In some instances, cremation remains can also be placed at these similar locations.

However, few significant developments have been made in the cremation, cemetery and funeral industry for displaying dynamic information about the deceased. One way of displaying information about a deceased individual is to carve the information directly onto the individual's headstone or gravestone. The information provided can give some idea of the individual's personal life, hobbies or other information that can immediately denote some characteristic or personal trait of the individual, however a more typical application is to provide basic location marking information such as name, date of birth, date of death, and a short epitaph. Beyond placing inscriptions or affixed plaques on a tombstone or memorial, it tends to be very difficult to identify characteristics about the individual that can have identified their personal traits, interests, or hobbies.

What is needed, therefore, is a dynamic, multi-touch enabled display device that enables visitors to interact with the memorial of a deceased individual for the purpose of interacting with a combination of dynamic and customizable digital touch media and content relating to the decedent or the remembrance of the decedent. There is a growing demand for personalization and the current technology and products utilized in application of memorialization do not address these demands.

BRIEF DESCRIPTION OF DRAWINGS

The drawings refer to embodiments of the present disclosure in which.

Figure 1A:
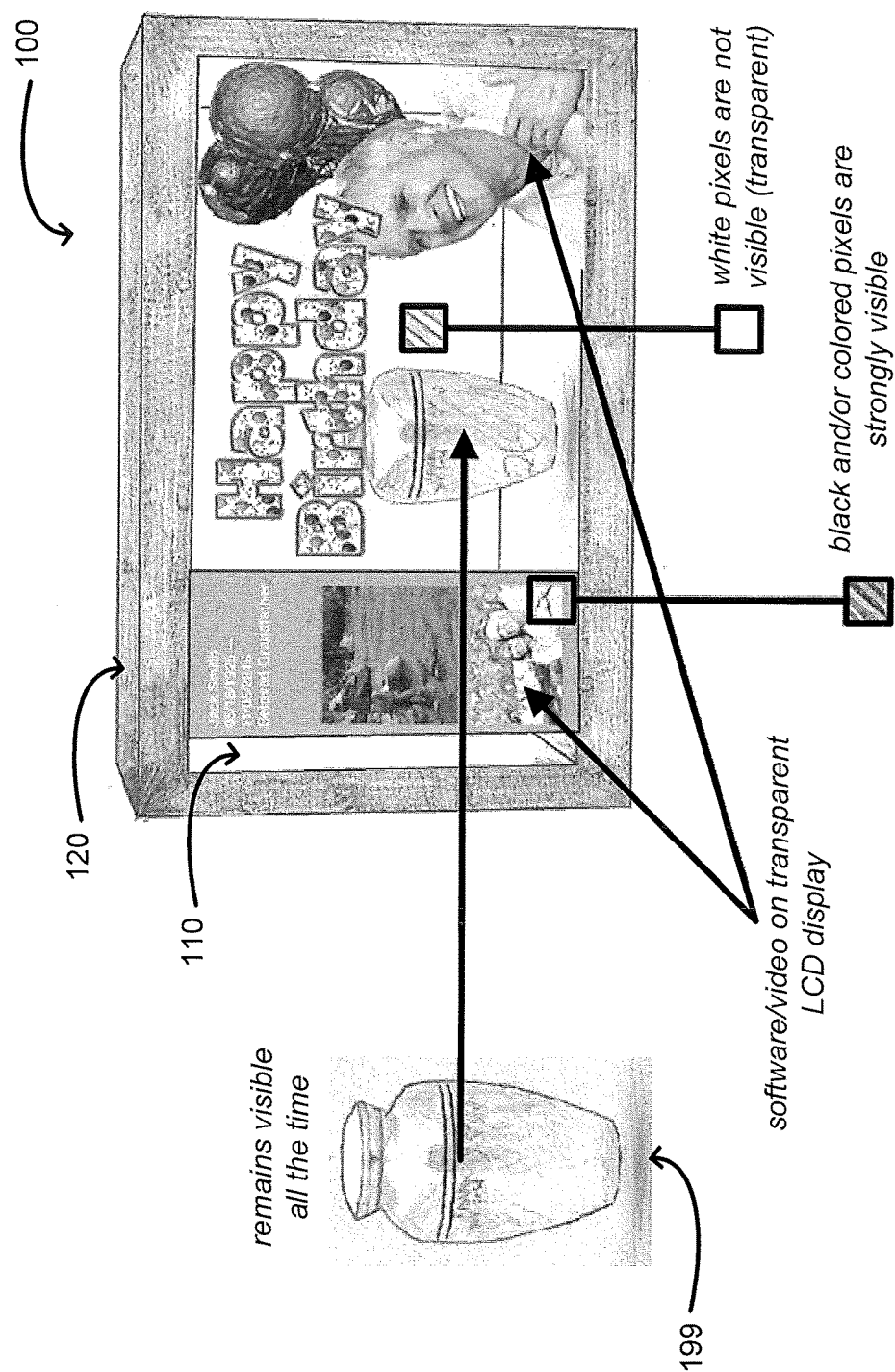
FIG. 1A illustrates an embodiment of an interactive memorial device for providing a dynamic, interactive multi-touch display to visitors of a memorial of a deceased individual in accordance with the present disclosure.

While the present disclosure is subject to various modifications and alternative forms, specific embodiments thereof have been shown by way of example in the drawings and will herein be described in detail. The concepts provided herein should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the concepts provided herein can be practiced without these specific details. In other instances, specific numeric references such as "first processor," can be made. However, the specific numeric reference should not be interpreted as a literal sequential order but rather interpreted that the "first processor" is different than a "second processor." Thus, the specific details set forth are merely examples. The specific details can be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the present disclosure describes an apparatus and a method for an interactive memorial device for providing a dynamic, interactive, multi-touch display device to visitors of a memorial of a deceased individual. The interactive memorial device enables the visitors to interact with a combination of dynamic and customizable information relating to the decedent or the remembrance of the deceased. Preferably, the interactive memorial device comprises one or more content navigation controls, one or more status indicators, and a non-transitory machine-readable storage medium that stores instructions. An operating system comprising instructions enables an end-user, such as any of the visitors, to interact with the operating system by way of the navigation controls. At least a portion of the operating system preferably is stored on the non-transitory machine-readable storage medium. In some embodiments, the operating system comprises familiar software, such as Windows, Mac OS X, Android, and the like. A display screen is configured to enable the visitors to view and interact with information displayed on the display screen. The display screen preferably is a transparent multi-touch display configured to provide dynamic memorialization content to the visitors. One or more loudspeakers are configured to play audio soundtracks configured to accompany memorial-related information. In some embodiments, the interactive memorial device includes a camera suitable for social networking functions, such as online video conferencing and chat.

Figure 1B:
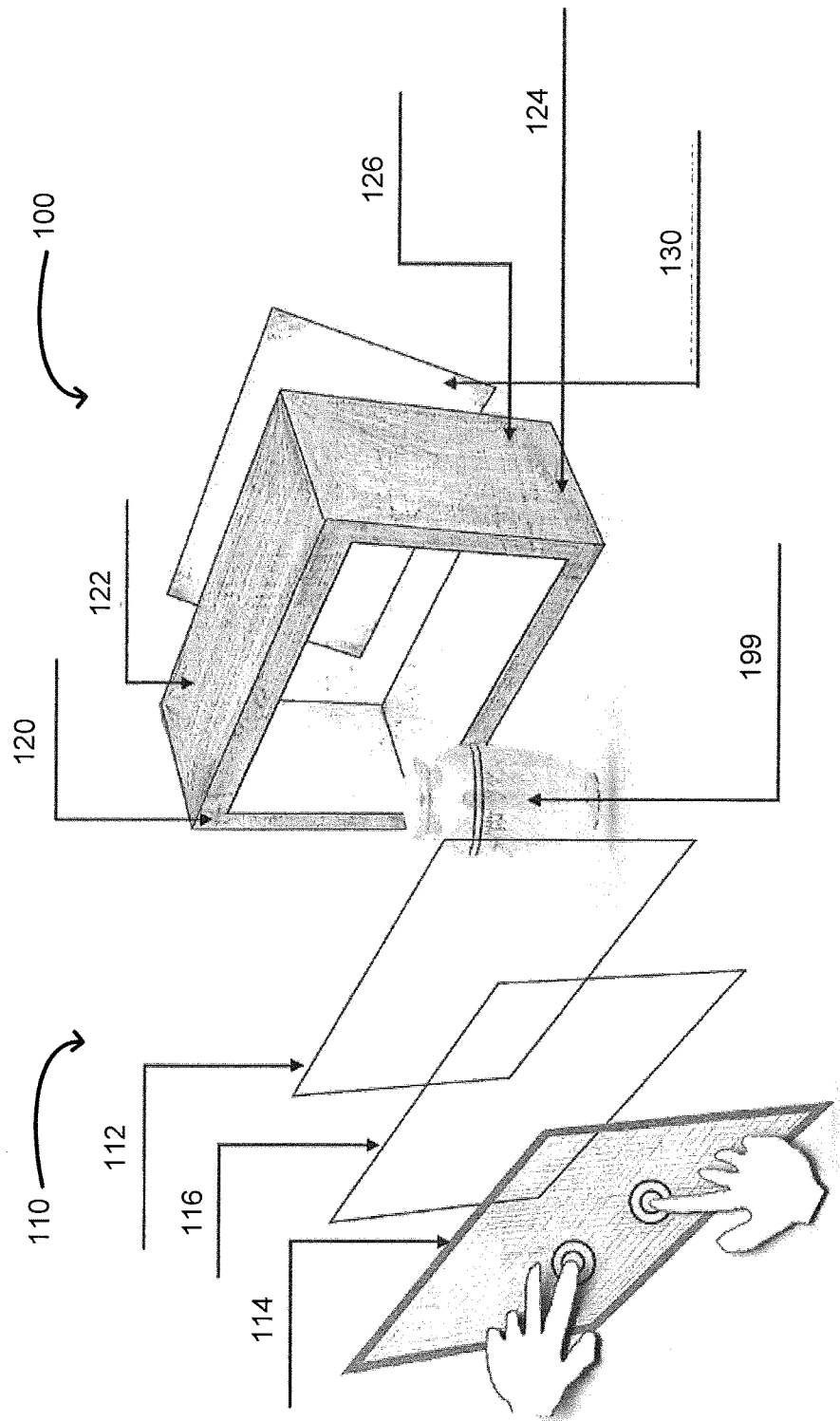
FIG. 1B illustrates an exploded view of an embodiment of an interactive memorial device for providing a dynamic, interactive multi-touch display to visitors of a memorial of a deceased individual, according to the present disclosure.

FIG. 1A illustrates an embodiment of an interactive memorial device 100 for providing a dynamic, interactive multi-touch display 110 to visitors of a memorial of a deceased individual. As shown, real memorialization objects 199 and/or personal mementos can be placed behind the multi-touch display 110 in a space defined by a customized, decorative bracket 120 of the interactive memorial device 100. As shown in FIG. 1B, the interactive memorial device 100 can also include a back panel 130 further defining the space for the real memorialization objects 199 and/or personal mementos. Like the customized, decorative bracket 120, the back panel can also be customized to honor the decedent.

FIG. 1B illustrates an exploded view of the interactive memorial device 100 of FIG. 1A, according to the present disclosure. In some embodiments, the multi-touch display 110 comprises a transparent liquid crystal display (LCD) panel 112 with a smart multi-touch interface 114 having functionality reminiscent of a smart-phone, tablet or other similar mobile device. It is envisioned that a glass sheet 116, or other durable transparent material, can be disposed over the transparent LCD panel 112 so as to prevent damage and wear to the LCD panel 112. Preferably, the transparent LCD panel 112 is affixed to a place of burial or memorialization of an individual, such as by way of non-limiting example, a grave, a tomb, an "above-ground grave" (resembling a sarcophagus), a mausoleum crypt, a columbarium niche, or other similar edifice. In some embodiments, the transparent LCD panel 112 can be affixed to the place of burial by way of a customized, decorative bracket 120 configured to replace a traditionally-used static, glass panel, thereby providing a dynamic customizable memorial display exhibit at the place of burial or remembrance. As will be appreciated, the transparency of the multi-touch display 110 is an important component of the interactive memorial device 100. In some embodiments, the transparency of the multi-touch display 110 ranges up to substantially 85% transparency. Further, in some embodiments the multi-touch display 110 is illuminated by way of ambient integrated LED backlighting 122 so as to facilitate viewing real memorialization objects 199 and or personal mementos behind the multi-touch display 110 in direct sunlight, at night, or in low-light conditions.

Figure 2:
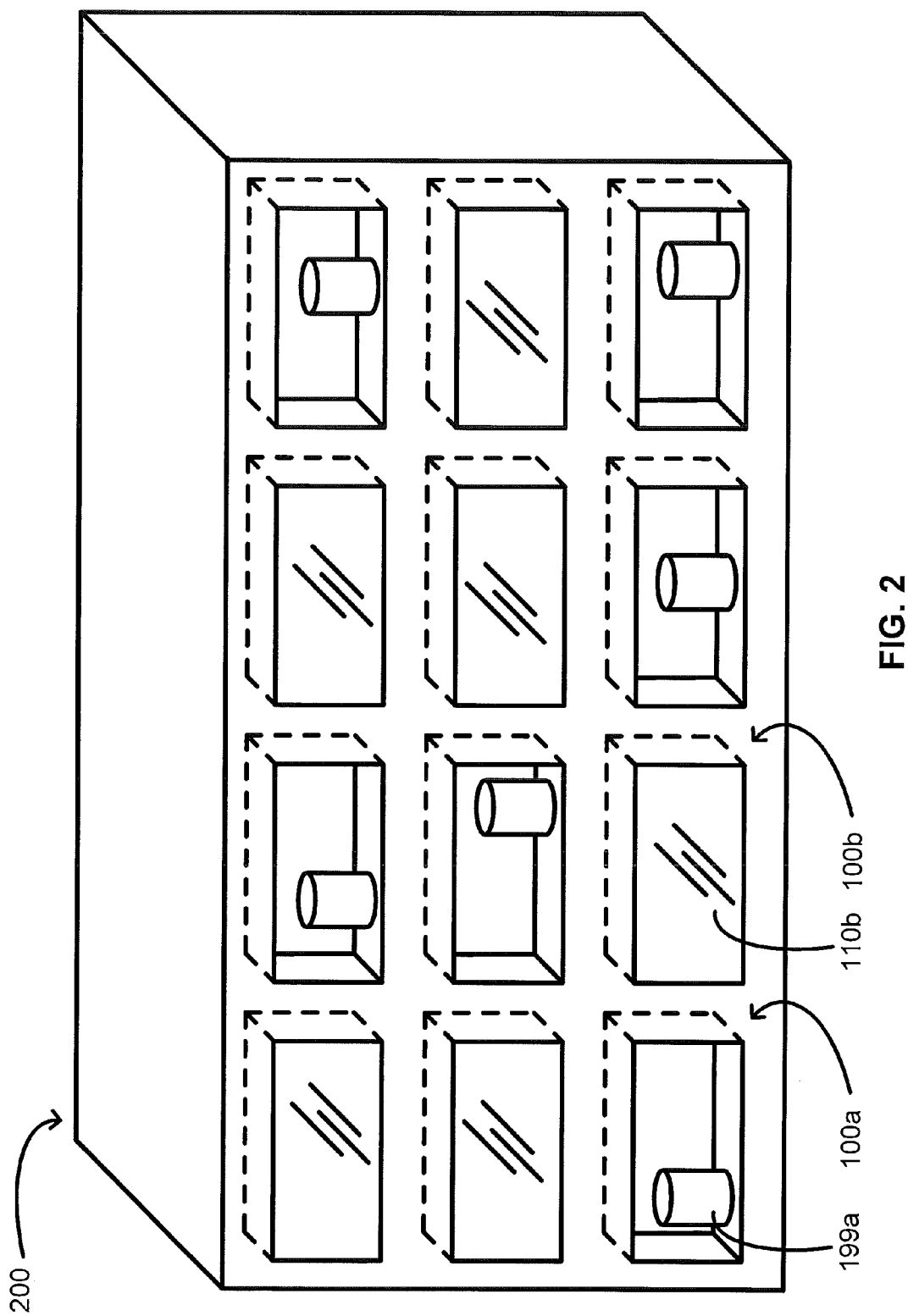
FIG. 2 illustrates an embodiment of a number of interactive memorial devices for providing dynamic, interactive multi-touch displays to visitors of memorials of deceased individuals, according to the present disclosure.

FIG. 2 illustrates an embodiment of a number of interactive memorial devices for providing dynamic, interactive multi-touch displays to visitors of memorials of deceased individuals, according to the present disclosure. In some embodiments, for example, the place of burial or memorialization of the individual is a columbarium niche in a columbarium 200. As shown, a first interactive memorial device 100a can be placed in a first columbarium niche of the columbarium 200, a second interactive memorial device 100b can be placed in a second columbarium niche of the columbarium 200, and so on depending upon the number of columbarium niches in the columbarium 200, thereby replacing static columbarium niche fronts with interactive memorial devices. As described herein, the interactive memorial device 100 includes the multi-touch display 110, which, in turn, includes the transparent LCD panel 112. The multi-touch display 110 of the first interactive memorial device 100a is shown as transparent in FIG. 2, which enables visitors to see real memorialization objects such as real memorialization object 199a. The multi-touch display 110 of the second interactive memorial device 100 (i.e., multi-touch display 110b) is shown as non-transparent in FIG. 2, which enables visitor interactions with the second interactive memorial device 100b. It should be understood that the multi-touch display 110 of the interactive memorial device 100, or portions of the multi-touch display 110, can be transparent, non-transparent, or a degree thereof (e.g., partially transparent or partially non-transparent) depending upon visitor interactions with the interactive memorial device 100.

As mentioned above, the interactive memorial device generally is configured to present dynamic, customizable decedent-related or memorialization content to visitors of the place of burial or memorial. In some embodiments, the information relating to the decedent or memorial can be managed, or administered by one or more end-users, such as by way of non-limiting example, family members of the decedent, cemetery staff, cemetery caretakers, general visitors, and the like. In some embodiments, the end-users can locally manage the information stored on a memory of the interactive memorial device, as well as functionality of the device, by directly interacting with the interactive memorial device at the place or burial. It is envisioned that the end-users can periodically refresh the stored information by making updates, storing additional information, correcting information, changing various settings that control the interactive memorial device, and the like. The stored information generally includes, but is not limited to, personalized memorial information, obituaries, photo galleries, video galleries, digital guestbook, and the like. In some embodiments, the interactive memorial device can further comprise two-way communications functionality, such as digital messaging by way of e-mail, social media, remote video conferencing, and the like.

In some embodiments, a multiplicity of interactive memorial devices can be wired together in a sequence or in a ring, such as a daisy-chain, and centrally powered and controllable by way of a centrally located multi-touch software. In some embodiments, the multiplicity of interactive memorial devices are network connected by way of physical, wired connections, such as a local area network (LAN). In some embodiments, the multiplicity of interactive memorial devices are connected to a wireless network by way of wireless connections, such as Wi-Fi, or other similar wireless connections. The multiplicity of interactive memorial devices generally is placed into communication with a server configured to host the centrally located multi-touch software, thereby enabling centrally controlling each of the interactive memorial devices. As will be appreciated, networking the multiplicity of interactive memorial devices facilitates incorporating an individual interactive memorial device into each burial site at a cemetery, for example, and thus enables cemetery caretakers to administer and maintain all of the memorial devices at the cemetery from a single location. Moreover, it is envisioned that each of the multiplicity of interactive memorial devices further comprises at least an HDMI port and a USB port so as to facilitate establishing a direct-wired connection with each device independently of the other devices. Those skilled in the art will appreciate that the HDMI and USB ports facilitate servicing, such as performing diagnostic operations on, the interactive memorial device when remote access is not operable.

In some embodiments, the end-users can remotely manage the information stored on the memory of the interactive memorial device by way of a multi-tenant, web-based software application accessible by way of the Internet. It is envisioned that the web-based software application can include a subscription-based recurring revenue model. For example, subscribing end-users can pay an annual fee for access, or administrative rights, to content stored on the memory of the interactive memorial device. Further, in some embodiments subscribing visitors can access the content stored on the memory of the interactive memorial device by way of the Internet in lieu of physically visiting the place of burial.

In some embodiments, an algorithm can be performed by the processor so as to create additional up-sell opportunities based on various predefined criteria, such as, but not limited to, visitation frequency, special events, military or social service affiliation, basic demographic data, psychographic data, and the like. It is envisioned that the predefined criteria can be used so as to create incremental service and merchandise revenue for items such as flowers for birthdays, flags for Memorial Day, vigil lights for the Holidays, flowers and decoration services for Valentine's Day, messages for special occasions, and the like. As will be recognized by those skilled in the art, the interactive memorial device of the present disclosure is particularly well-suited for a wide variety of uses, including, but not limited to, memorial presentations, digital signage, information kiosks, as well as point-of-sale and point-of-use installations within the context of cemetery, funeral, and cremation businesses. For example, the digital signage can be used by the family to publicly post notes (e.g., birthday, anniversary announcements, etc.) or used by the family and a cemetery as a communication vehicle between the cemetery and the family for announcements, special offers, etc.

It should be understood that the interactive memorial device generally comprises one or more processors, the transparent multi-touch display, the one or more loudspeakers, the one or more navigation controls, a wireless data communication interface, and a non-transitory machine-readable storage medium that stores instructions, which when executed by the machine causes the machine to perform operations according to the instructions. In some embodiments, the one or more processors comprise Android-based processors. In some embodiments, the software used to facilitate the operating system can be embodied onto the non-transitory machine-readable medium. Generally, a machine-readable medium includes any mechanism that stores information in a form readable by a machine (e.g., a computer). For example, a machine-readable medium includes read only memory (ROM); random access memory (RAM); magnetic disk storage media; optical storage media; flash memory devices; Digital Video Disc (DVD's), EPROMs, EEPROMs, FLASH memory, magnetic or optical cards, or any type of media suitable for storing electronic instructions. In some embodiments, the operating system can be stored at least in part on the non-transitory machine-readable storage medium, wherein the operating system comprises instructions that enable the end-user to interact with the operating system by way of the one or more navigation controls.

Figure 3:
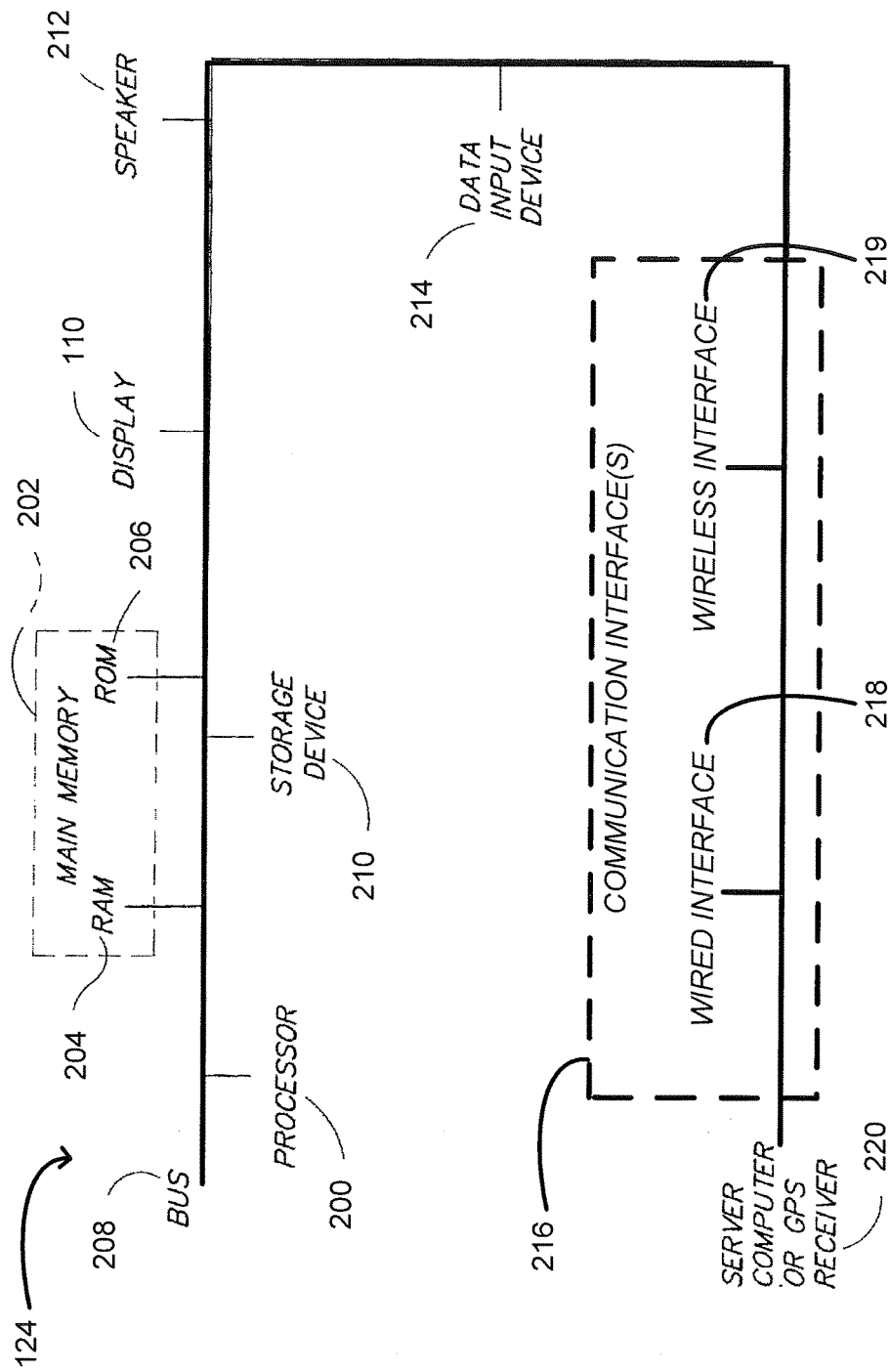
FIG. 3 illustrates a block diagram of an embodiment of various electrical components that can be contained within the interactive memorial device.

Following on the foregoing, FIG. 3 is a block diagram of some electrical components 124 that can be optionally contained within the bracket 120 of the interactive memorial device 100. In some embodiments, for example, the electrical components 124 can include a processor 200 (e.g., a reduced instruction set computing [RISC] architecture such as ARM or a low-voltage architecture such as Intel® ATOM™) and an area of main memory 202 including random access memory (RAM) 204 and read only memory (ROM) 206 connected by one or more data buses 208. Also connected to the one or more data buses 208 in some embodiments is a storage device 210 (e.g., the non-transitory machine-readable storage medium that stores instructions), the display 110, a loudspeaker 212, and one or more data input devices 214 (e.g., the smart multi-touch interface 114, a keyboard, a mouse, etc.).

In some embodiments, the electrical components 124 can include a communications interface 216. The communications interface 216 can be any communications interface for connecting the interactive memorial device 100 to other devices, systems, or networks such as the Internet. For example, the communications interface 216 can connect the interactive memorial device 100 to a server computer 222. The server computer 222 can provide a larger storage capacity for multimedia files concerning the decedent, which can then be replayed by selection of the user through the interactive memorial device 100 at the site of the interactive memorial device 100. The communications interface 216 can also provide a means for distant relatives and friends who are unable to visit the interactive memorial device 100 to update media for viewing by visitors to the interactive memorial device 100.

The communications interface can include a wired interface 218, a wireless interface 219, or both the wired interface 218 and the wireless interface 219. The wired interface 218 can include, but is not limited to, any wired interface configured for use with twisted-pair cabling. The wireless interface 219 can include, but is not limited to, a wireless interface configured for Bluetooth®, Wi-Fi, a mobile telecommunications technology, GPS, or some combination thereof. For example, the wireless communication device 219 can be a GPS transceiver that receives satellite signals from orbiting GPS satellites. Using software stored in the storage device 210, loaded into the main memory 202, and operating under the control of the processor 200, the GPS transceiver can be used to compute the latitude and longitude coordinates of the interactive memorial device 100. Alternatively, using software integrated into the GPS transceiver, the GPS transceiver can transmit the coordinates through a satellite transponder such that a mobile wireless communication device with a GPS receiver 220 can receive the coordinates and determine directions to the interactive memorial device 100.

The bracket 120 can also encase a media board and conventional power supply 126 (see FIG. 1B) for operating the foregoing components, which can be a long-life dry cell battery (such as a lithium battery), rechargeable batteries, or solar panels.

As such, provided herein in some embodiments is an interactive memorial device for providing an interactive environment to visitors of a final resting place of a deceased individual, comprising: a display screen configured to enable the visitors to view and interact with memorial-related information displayed on the display screen; one or more loudspeakers configured to play audio soundtracks accompanying the memorial-related information; and a decorative bracket configured to affix the interactive memorial device to a place of burial, wherein the decorative bracket is configured to replace a traditionally-used static, glass panel, thereby providing a dynamic customizable memorial display exhibit at the place of burial for the visitors to physically interact with the final resting place of the deceased individual. In some embodiments, the decorative bracket is configured to replace a traditionally-used static, glass panel, thereby providing a dynamic customizable memorial display exhibit at the place of burial. In some embodiments, the display screen comprises a transparent liquid crystal display (LCD) panel with a smart multi-touch interface enabling the visitors to tactilely interact with the interactive environment provided by the interactive memorial device. In some embodiments, the transparent LCD panel is affixed to the place of burial of the deceased individual. In some embodiments, the transparency of the transparent LCD panel ranges up to substantially 85% transparency. In some embodiments, the display screen is illuminated by way of ambient integrated LED backlighting so as to facilitate viewing real objects in the background and behind the multi-touch display in all light conditions, including direct sunlight or at night. In some embodiments, the information relating to the decedent is managed, or administered by one or more individuals selected from family members of the deceased individual, cemetery staff, cemetery caretakers, and the visitors of the final resting place of the deceased individual. In some embodiments, one or more of the visitors locally manages the information stored on a memory of the interactive memorial device by directly interacting with the interactive memorial device at the place or burial. In some embodiments, the interactive memorial device is configured to support two-way communications functionality selected from digital messaging by way of e-mail, social media, remote video conferencing, and a combination thereof. In some embodiments, a multiplicity of interactive memorial devices can be wired together in a sequence or in a ring including a daisy-chain, and centrally powered and controllable by way of a centrally located multi-touch software. In some embodiments, the multiplicity of interactive memorial devices are network connected by way of physical, wired connections including a local area network (LAN). In some embodiments, the multiplicity of interactive memorial devices are connected to a wireless network by way of wireless connections including Wi-Fi. In some embodiments, the multiplicity of interactive memorial devices are in communication with a server configured to host the centrally located multi-touch software, thereby enabling centrally controlling each of the interactive memorial devices. In some embodiments, the interactive memorial device comprises at least an HDMI port and a USB port configured to support direct wired connections independently of other devices. In some embodiments, the interactive memorial device comprises a multi-tenant, web-based software application accessible by way of the Internet and configured to enable an interactive-memorial device manager or one or more of the visitors of the final resting place of the deceased individual to remotely manage the information stored on a memory of the interactive memorial device. In some embodiments, the web-based software application is configured to enable virtual visitors to virtually access the content stored on a memory of the interactive memorial device by way of the Internet. In some embodiments, the interactive memorial device further comprises a non-transitory machine-readable storage medium that stores instructions that, when executed by the interactive memorial device, cause the interactive memorial device to provide the interactive environment to the visitors; and an operating system comprising instructions that enable the visitors to interact with the operating system by way of one or more navigation controls, wherein at least a portion of the operating system is stored on the non-transitory machine-readable storage medium.

Also provided herein in some embodiments is an interactive memorial device for providing an interactive environment to visitors of a final resting place of a deceased individual, comprising: a decorative bracket configured to affix the interactive memorial device to a place of burial of the deceased individual, wherein the decorative bracket defines a space configured to house one or more real objects associated with the deceased individual; a display screen configured to enable the visitors to view and interact with memorial-related information displayed on the display screen, wherein the display screen comprises a transparent liquid crystal display (LCD) panel with a smart multi-touch interface enabling the visitors to tactilely interact with the interactive environment provided by the interactive memorial device and view the real object behind the multi-touch display; and one or more loudspeakers configured to play audio soundtracks accompanying the memorial-related information. In some embodiments, the transparent LCD panel ranges up to substantially 85% transparency, and integrated LED backlighting in the decorative bracket facilitates viewing the one or more real objects under all light conditions including direct sunlight or at night. In some embodiments, the interactive memorial device includes one or more communication interfaces selected from a wired interface and a wireless interface, and system software for the interactive memorial device is configured to enable remotely administered updates to the memorial-related information. In some embodiments, the one or more communication interfaces support two-way communications functionality selected from digital messaging by way of e-mail, social media, remote video conferencing, and a combination thereof.

While the concepts provided herein have been provided in terms of particular variations and illustrative figures, those of ordinary skill in the art will recognize that the concepts provided herein are not limited to the variations or figures described. In addition, where methods and steps described above indicate certain events occurring in certain order, those of ordinary skill in the art will recognize that the ordering of certain steps can be modified and that such modifications are in accordance with the variations of the concepts provided herein. Additionally, certain of the steps can be performed concurrently in a parallel process when possible, as well as performed sequentially as described above. To the extent there are variations of the concepts provided herein, which are within the spirit of the disclosure or equivalent to the claimed invention, it is the intent that this patent will cover those variations as well. Therefore, the present disclosure is to be understood as not limited by the specific embodiments described herein, but only by scope of the appended claims.

What is claimed is:

1. An interactive memorial device for providing an interactive environment to visitors of a final resting place of a deceased individual, comprising:
   a display screen configured to enable the visitors to view and interact with memorial-related information displayed on the display screen;
   one or more loudspeakers configured to play audio soundtracks accompanying the memorial-related information; and
   a decorative bracket configured to affix the interactive memorial device to a place of burial, wherein the decorative bracket is configured to replace a traditionally-used static, glass panel, thereby providing a dynamic customizable memorial display exhibit at the place of burial for the visitors to physically interact with the final resting place of the deceased individual, wherein the display screen comprises a transparent liquid crystal display (LCD) panel with a smart multi-touch interface enabling the visitors to tactilely interact with the interactive environment provided by the interactive memorial device, and wherein the display screen is illuminated by way of ambient integrated LED backlighting so as to facilitate viewing of real objects in a background and behind the multi-touch display in lighting conditions including direct sunlight or at night.

2. The interactive memorial device of claim 1, wherein the transparent LCD panel is affixed to the place of burial of the deceased individual.

3. The interactive memorial device of claim 1, wherein the transparency of the transparent LCD panel ranges up to substantially 85% transparency.

4. The interactive memorial device of claim 1, wherein the information relating to the decedent is managed, or administered by one or more individuals selected from family members of the deceased individual, cemetery staff, cemetery caretakers, and the visitors of the final resting place of the deceased individual.

5. The interactive memorial device of claim 1, wherein one or more of the visitors locally manages the information stored on a memory of the interactive memorial device by directly interacting with the interactive memorial device at the place of burial.

6. The interactive memorial device of claim 1, wherein the interactive memorial device is configured to support two-way communications functionality selected from digital messaging by way of e-mail, social media, remote video conferencing, and a combination thereof.

7. The interactive memorial device of claim 1, wherein a multiplicity of interactive memorial devices can be wired together in a sequence or in a ring including a daisy-chain, and centrally powered and controllable by way of a centrally located multi-touch software.

8. The interactive memorial device of claim 7, wherein the multiplicity of interactive memorial devices are network connected by way of physical, wired connections including a local area network (LAN).

9. The interactive memorial device of claim 7, wherein the multiplicity of interactive memorial devices are connected to a wireless network by way of wireless connections including Wi-Fi.

10. The interactive memorial device of claim 1, wherein the multiplicity of interactive memorial devices are in communication with a server configured to host the centrally located multi-touch software, thereby enabling centrally controlling each of the interactive memorial devices.

11. The interactive memorial device of claim 1, wherein the interactive memorial device comprises at least an HDMI port and a USB port configured to support direct wired connections independent of other devices.

12. The interactive memorial device of claim 1, wherein the interactive memorial device comprises a multi-tenant, web-based software application accessible by way of the Internet and configured to enable an interactive-memorial device manager or one or more of the visitors of the final resting place of the deceased individual to remotely manage the information stored on a memory of the interactive memorial device.

13. The interactive memorial device of claim 12, wherein the web-based software application is configured to enable virtual visitors to virtually access the content stored on a memory of the interactive memorial device by way of the Internet.

14. The interactive memorial device of claim 1, further comprising:
   a non-transitory machine-readable storage medium that stores instructions that, when executed by the interactive memorial device, cause the interactive memorial device to provide the interactive environment to the visitors; and
   an operating system comprising instructions that enable the visitors to interact with the operating system by way of one or more navigation controls, wherein at least a portion of the operating system is stored on the non-transitory machine-readable storage medium.

15. An interactive memorial device for providing an interactive environment to visitors of a final resting place of a deceased individual, comprising:
   a decorative bracket configured to affix the interactive memorial device to a place of burial of the deceased individual,
   wherein the decorative bracket defines a space configured to house one or more real objects associated with the deceased individual;
   a display screen configured to enable the visitors to view and interact with memorial-related information displayed on the display screen,
   wherein the display screen comprises a transparent liquid crystal display (LCD) panel with a smart multi-touch interface enabling the visitors to tactilely interact with the interactive environment provided by the interactive memorial device and view the real object behind the multi-touch display; and
   one or more loudspeakers configured to play audio soundtracks accompanying the memorial-related information.

16. The interactive memorial device of claim 15, wherein the transparent LCD panel ranges up to substantially 85% transparency, and
   wherein integrated LED backlighting in the decorative bracket facilitates viewing the one or more real objects under lighting conditions including direct sunlight or at night.

17. The interactive memorial device of claim 16, wherein the interactive memorial device includes one or more communication interfaces selected from a wired interface and a wireless interface, and
   wherein system software for the interactive memorial device is configured to enable remotely administered updates to the memorial-related information.

18. The interactive memorial device of claim 17, wherein the one or more communication interfaces support two-way communications functionality selected from digital messaging by way of e-mail, social media, remote video conferencing, and a combination thereof.

* * * * *